United States Patent
Klingner et al.

(10) Patent No.: US 7,614,483 B2
(45) Date of Patent: Nov. 10, 2009

(54) ADJUSTING DEVICE FOR PNEUMATICALLY ACTUATABLE DISK BRAKES AND DISK BRAKES

(75) Inventors: Matthias Klingner, Puchheim (DE); Georg Kempinger, Munich (DE); Wlodzimierz Macke, Olching (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 50 days.

(21) Appl. No.: 11/498,780

(22) Filed: Aug. 4, 2006

(65) Prior Publication Data

US 2007/0068745 A1 Mar. 29, 2007

Related U.S. Application Data

(63) Continuation of application No. PCT/EP2005/001126, filed on Feb. 4, 2005.

(30) Foreign Application Priority Data

Feb. 4, 2004 (DE) ........................ 10 2004 005 509

(51) Int. Cl.
  *F16D 65/14* (2006.01)
  *F16D 55/00* (2006.01)
(52) U.S. Cl. ............... 188/71.7; 188/73.1; 188/196 BA; 192/70.17
(58) Field of Classification Search ............... 188/71.7, 188/71.9, 73.1, 196 D, 196 V, 196 BA, 79.51; 192/41 S, 70.17, 30 V, 207
See application file for complete search history.

(56) References Cited

U.S. PATENT DOCUMENTS

| 3,550,732 | A | * | 12/1970 | Beller ..................... 188/196 D |
| 3,638,511 | A | | 2/1972 | Kirschner |
| 3,942,827 | A | | 3/1976 | Warlop et al. |
| 5,353,896 | A | | 10/1994 | Baumgartner et al. |
| 5,653,321 | A | * | 8/1997 | Takaoka et al. .......... 192/70.17 |
| 5,765,673 | A | * | 6/1998 | Nishiyama et al. ...... 192/85 AA |
| 6,695,114 | B2 | * | 2/2004 | Helmstadter et al. ..... 192/70.18 |
| 6,827,343 | B2 | * | 12/2004 | Skiera ....................... 267/154 |

FOREIGN PATENT DOCUMENTS

| DE | 16 00 182 B2 | 1/1970 |
| DE | 1 921 099 | 10/1970 |
| DE | 198 55 538 A1 | 6/2000 |
| EP | 0 531 321 B1 | 3/1993 |
| GB | 1154449 | 6/1969 |
| JP | 4-254045 A | 9/1992 |

\* cited by examiner

*Primary Examiner*—Melody M Burch
(74) *Attorney, Agent, or Firm*—Crowell & Moring LLP (57) ABSTRACT

The invention relates to an adjusting device of a disk brake, in particular a pneumatically actuatable disk brake. The adjusting device is in embodied in such a manner that it can rotate at least one rotatable spindle which acts upon at least one pressure piece on the brake lining and which comprises an output toothing arrangement. The output toothing arrangement comprises at least one tooth which engages in a groove of the rotatable spindle. The invention is characterized in that the output toothing arrangement and/or the groove are embodied in such a manner that they can be elastically compressed.

11 Claims, 12 Drawing Sheets

PRIOR ART

Fig. 5

PRIOR ART

PRIOR ART

ADJUSTING DEVICE FOR PNEUMATICALLY ACTUATABLE DISK BRAKES AND DISK BRAKES

This application is a Continuation of PCT/EP2005/001126, filed Feb. 4, 2005, and claims the priority of DE 10 2004 005 509.2, filed Feb. 4, 2004, the disclosures of which are expressly incorporated by reference herein.

BACKGROUND AND SUMMARY OF THE INVENTION

The invention relates to an adjusting device of a disk brake, and to a disk brake equipped with such a device.

Adjusting devices on disk brakes are used to compensate for the brake linings which become thinner owing to wear and which become displaced in the direction of the disk brake in order to set a desired venting play so that the working stroke necessary for braking remains constant.

Figure 6:
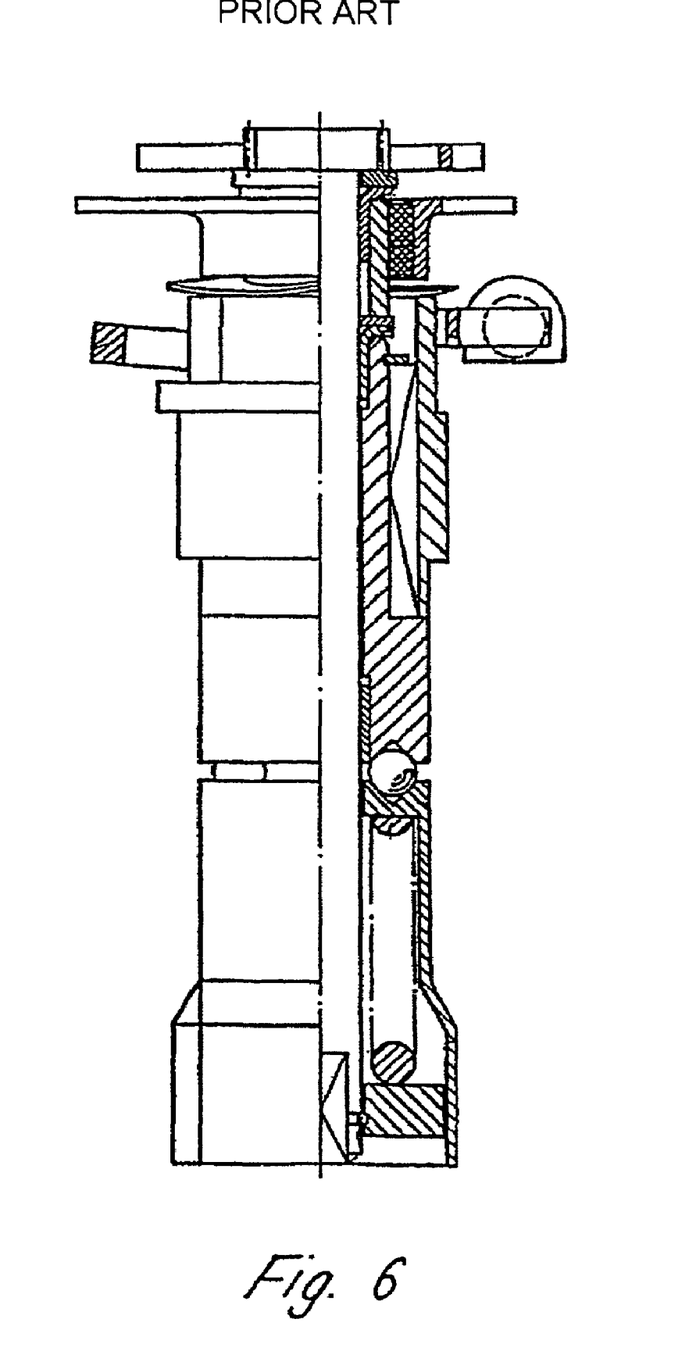
FIG. 6 shows a section through an adjuster according to the prior art.

Adjusting devices of the generic type are known from the European patent EP 0 531 321 B1. For the individual details of the functioning of the adjusting device of the generic type and an example of a disk brake which can be activated by a rotary lever and for which the adjuster of the generic type, but also the adjuster according to the invention, is suitable, reference is made to the entire contents of this document. An adjuster of this generic type is shown in FIG. 6.

The adjusting devices illustrated in EP 0 531 321 B1 have proven satisfactory. They are arranged in the interior of rotatable spindles which are fitted with pressure elements which act on one of the brake linings. They are suitable for disk brakes of various types having one or more rotatable spindles have.

During an adjusting movement when braking, the adjusting devices of the generic type transmit, by means of an output bushing, a torque to the rotatable spindle which is fitted with the pressure element at its end facing the brake disk, said pressure element acting on the lining carrier plate of a brake lining. The rotational movement of the rotatable spindle causes the pressure element to be displaced axially in the direction of the disk brake in order to compensate for a reduction in the thickness of the brake lining material which is caused by wear. In order to ensure the adjusting function, the adjusting devices generally have a freewheel so that the adjuster does not rotate backwards when the brake is released, and an overload coupling which responds when the pressure elements are applied to the brake lining.

The output bushing of the prior art is provided on its outer circumference with at least one radially projecting tooth-like tooth for engaging in at least one corresponding tooth-like groove on the inner circumference of the rotatable spindle. This arrangement has proven effective.

The prior art also includes German patent DE 1600182 B2, an example of the prior art in adjusting devices. This document presents an elastic support of lugs by means of springs. When the tension of the application device is released, the springs press the lugs one against the other. However, the rotatable spindle does not act on a brake lining by means of a pressure element.

Against this background, the object of the invention is to further develop the adjusting device of the generic type in such a way that its function is optimized still further.

This object is achieved by the invention as follows.

In one output tooth arrangement, the at least one tooth and/or the at least one groove is/are embodied so as to be elastically compressible, and/or the at least one tooth and/or the at least one groove is/are supported elastically one against the other, and/or a plurality of the teeth and/or a plurality of groove sections (9, 9') are supported elastically (in particular in a sprung fashion) one against the other.

According to this, the output tooth arrangement, in particular at least one tooth and/or the at least one groove, are embodied so as to be elastically compressible and/or supported elastically one against the other.

According to the invention, an adjusting device is implemented which compensates without play for all fabrication tolerances at the interface between the output sleeve of the adjusting device and the adjusting rotatable spindle (typically a threaded tube) without jamming occurring when the adjuster shaft is rotated and slid.

In contrast to this, even the adjusting properties in the case of shaking stresses, rotation and sliding of the adjuster shaft with respect to the threaded tube or rotatable spindle shaft, repeat attempts as a result of static application and their combination are positively influenced.

The invention is particularly advantageously suitable for an adjusting device with an output bushing which engages in an axial opening in the rotatable spindle and which on its outer circumference has at least one tooth which engages in a groove on the inner circumference of the rotatable spindle. However, it can also theoretically be used in other arrangements if, for example, the rotatable spindle has in certain sections an outer toothing which intermeshes with an output wheel of the adjusting device (which can also have an electric drive).

Play-free shaft-hub connections are known per se. Their use in adjusting devices for brakes has previously not been considered. In this respect, the following are specified DE 1921099 A, JP 4254045 AA, DE 1205345 B and DE 19855538 A1.

In particular, the effect of the invention can be implemented by means of a spring which prestresses in a sprung fashion two or more teeth, which can move relative to one another, of the output tooth arrangement and/or two outer edge sections, which can move relative to one another, of a single tooth or of a plurality of teeth.

According to a particularly functionally reliable alternative, the at least one single-part or multi-part tooth preferably has the two outer edge parts which can move relative to one another and between which at least one or more compression spring(s) is/are arranged, which compression springs press the two outer edge parts apart from one another in such a way that the two outer edges bear without play against the inner edges of the groove.

In this context, the one outer edge part is preferably formed in one piece with the output bushing, and the other outer edge part is guided in a moveable, in particular slideable, fashion on the outer circumference of the output bushing.

According to an alternative variant, which is easy to implement and nevertheless functionally reliable and also of course inventive, the output bushing is adjoined axially by a toothed disk whose diameter corresponds to the diameter of the output bushing and which has at least one tooth which corresponds to the tooth of the output bushing, and the groove of the rotatable spindle extending axially into the region of the tooth of the toothed disk. Here, the toothed disk is designed so as to be rotatable relative to the output bushing and the toothed disk and the output bushing are prestressed relative to one another by means of a spring, in particular a torsion spring, so that the tooth arrangement easily has at least two teeth which are spring prestressed relative to one another and thus elastically compressible relative to one another. Possible springs are, for example, disk springs or helical springs.

The rotation position between the toothed disk and the output bushing can expediently be secured by means of a toothed coupling in order to fix a desired degree of prestress.

In a further embodiment it is also possible to provide for the output part of the adjuster to be embodied as a sleeve with an inner profile, and for the rotatable spindle to have an outer profile, the output part of the adjuster then engaging around the rotatable spindle and the outer teeth the rotatable spindle engaging in grooves of the output part of the adjuster. In this arrangement, the invention can also be used in a quasi inverted manner.

According to a further preferred variant, an annular disk is fitted onto, or arranged on, an axial end of the rotatable spindle with one or more of the grooves, the inner circumferential profile of said annular disk corresponding to the inner circumferential profile of the rest of the spindle, that is to say also having the groove, the annular disk and the spindle being prestressed relative to one another by means of a sprung element. The groove is thus also capable of being compressed in itself, as it were in the manner of multiple parts (one part in the annular disk and one in the rotatable spindle). This embodiment variant also implements the advantages of the invention.

It is finally also conceivable for a spring which elastically prestresses the tooth and the groove one against the other to be arranged directly between one of the outer edges of a tooth of the output part and the inner edge of the groove.

Other objects, advantages and novel features of the present invention will become apparent from the following detailed description of the invention when considered in conjunction with the accompanying drawings.

BRIEF DESCRIPTION OF THE DRAWINGS

FIGS. 1a, b show a cross-sectional view of the output-bushing-side section of an adjuster according to an embodiment of the invention and an axial-side view of this section;

FIGS. 12a, b show perspective views of elements of the adjuster from FIGS. 10 and 11.

DETAILED DESCRIPTION

Figure 1:
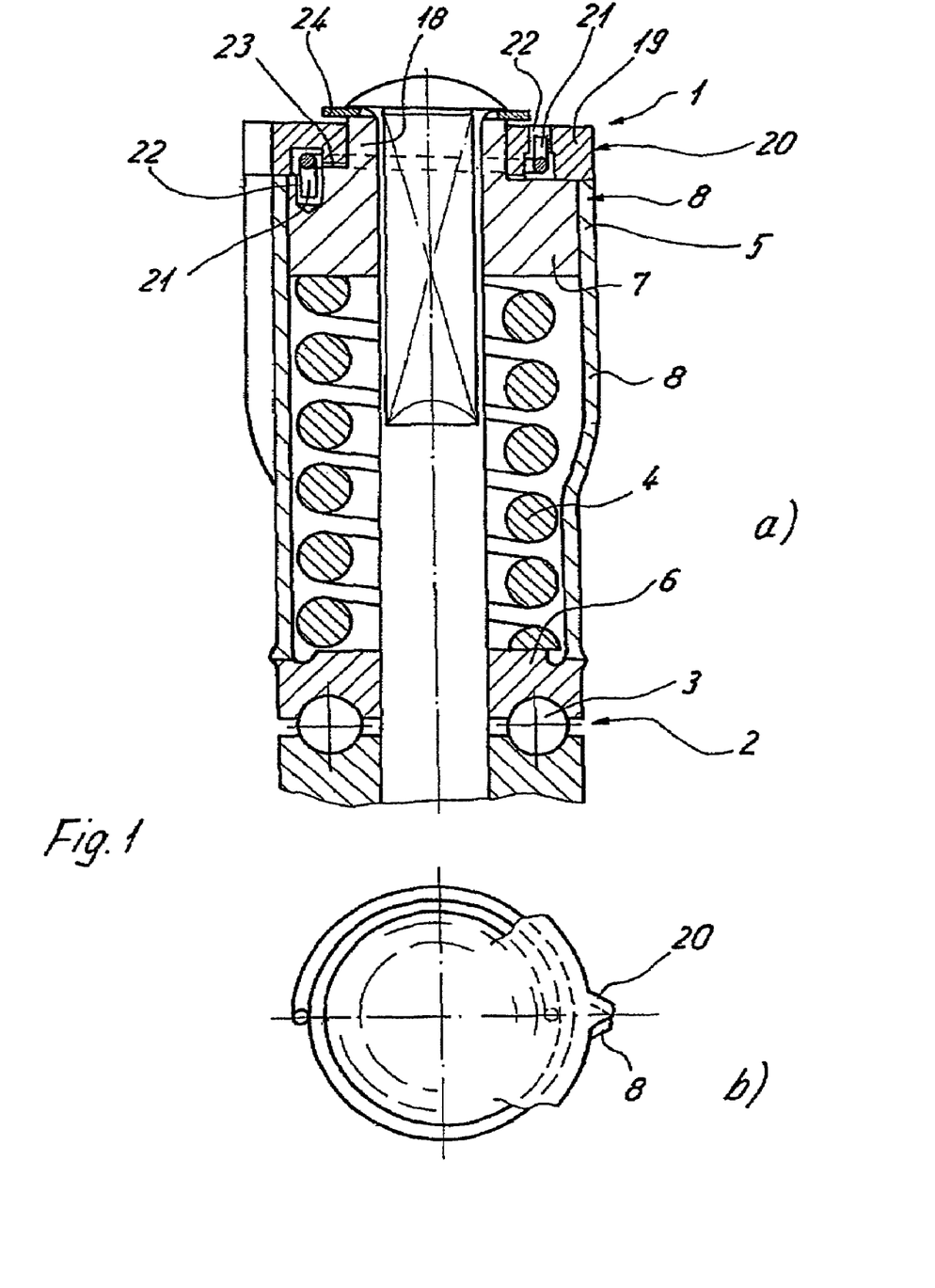

FIG. 1 shows an output-bushing-side section of an adjusting device according to the invention which otherwise can be designed, by way of example, in the manner of EP 0 531 321 B1, in particular in the manner of FIG. 5. The invention is however not restricted to the adjuster shown there but rather is suitable for all types of adjusters in which an output bushing engages in a rotatable spindle which is nonrotatable relative to the output bushing or rotates with it in the case of adjusting movements with it, in which case it is displaced axially relative to the output bushing.

In addition to an overload coupling 2 with a spherical ramp arrangement 3 and a compression spring 4 which is adjoined here in the downward direction by further elements such as a freewheel and an output connection to the rotatable lever (not shown here, see FIG. 4), the adjusting device 1 has an output bushing 5 at one of its axial ends.

The compression spring 4 is arranged in the interior of the output bushing 5 and is supported between a spherical-ramp-side disk 6, which closes off the output bushing 5 axially at one of its ends, and a second disk 7 which is inserted in a nonrotatable fashion into the output bushing 5 at its other end, facing away from the spherical ramp arrangement 3.

Figure 2:
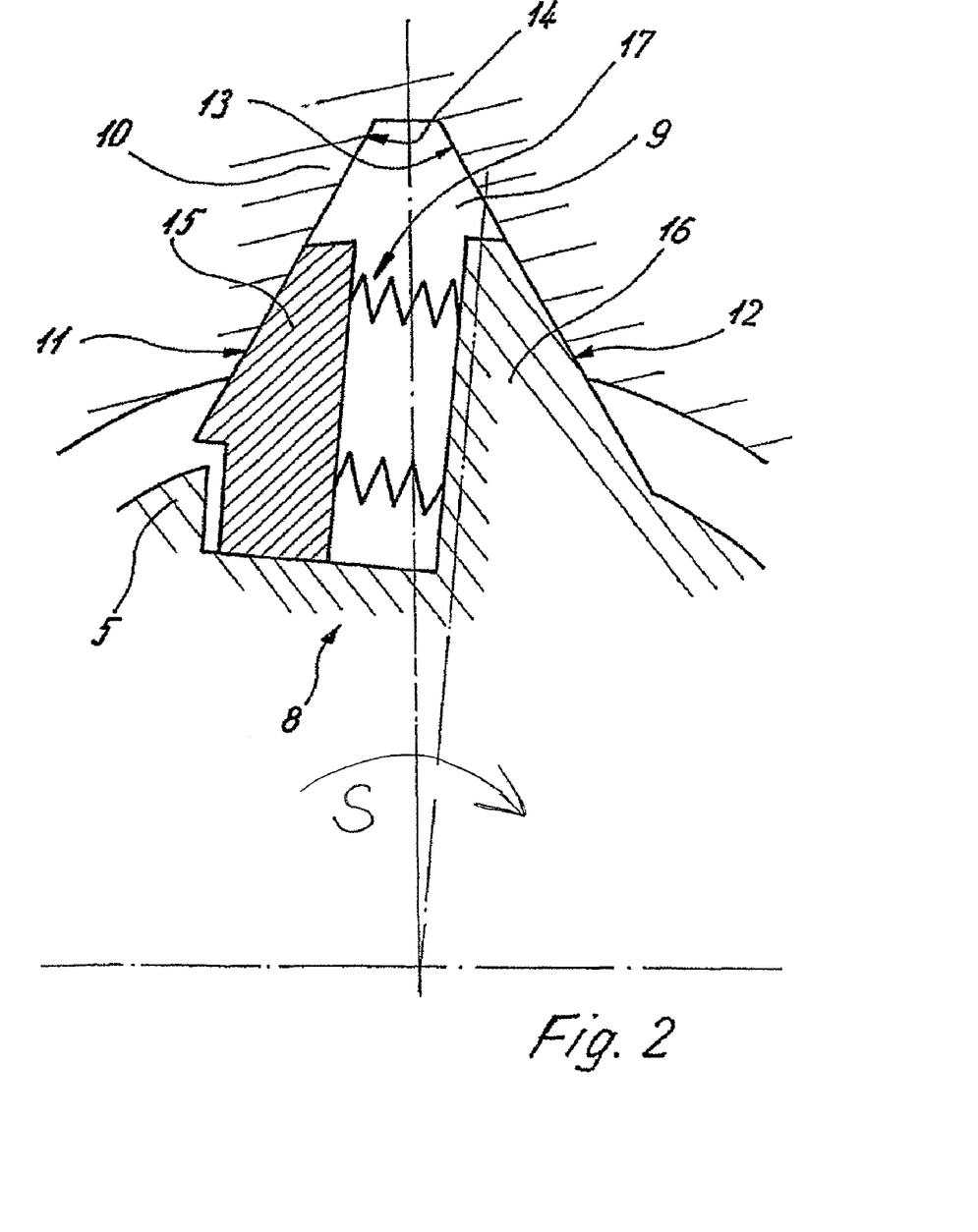
FIG. 2 shows a section through the area of the engagement of an output tooth of the output bushing of the adjuster according to an embodiment of the invention which engages in a corresponding groove in the rotatable spindle which surrounds the output bushing.

The output bushing 5 has here a cylindrical cross section, with at least one output tooth arrangement with at least one radially projecting tooth 8 being formed in certain sections on the outer circumference of the output bushing 5, said tooth 8 serving to engage in at least one corresponding tooth-like groove 9 in the rotatable spindle 10, see in this respect the other exemplary embodiment of FIG. 2, in order to also rotate said rotatable spindle 10 in order to carry out adjusting movements and when the brake lining is changed. The output bushing 5 is guided in the rotatable spindle 10 so as to be capable of being slid relative to it in the axial direction but not rotated.

Two or more of the teeth 8 and of the grooves 9 can also be distributed on the output bushing 5 or on the rotatable spindle.

Figure 3:
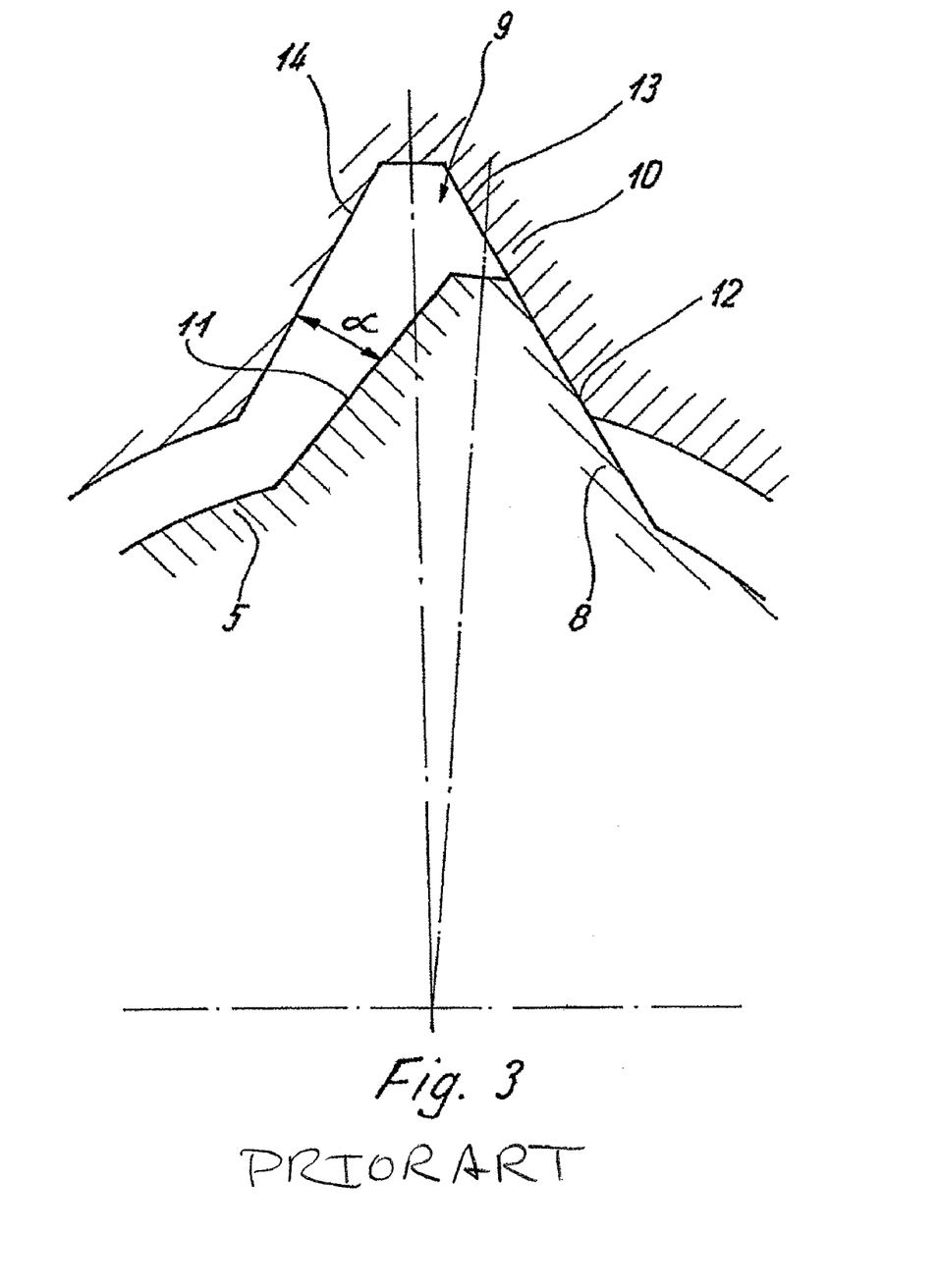
FIGS. 3-5 are illustrations of an adjuster according to the prior art, which are analogous to FIG. 2, in various operating positions.

In order to minimize the play which is inevitably present due to fabrication reasons (and which corresponds to the angle $\alpha$) in FIG. 3 between the output tooth arrangement and the groove 9 or to make it near to zero, the output tooth arrangement is embodied so as to be elastically compressible.

Thus, according to FIG. 2, when the tooth 8 is inserted into the groove, it is compressed and widened that during engagement in the groove in such a way that it rests with its two outer edges 11, 12 on the inner edges 13, 14 of the groove 9 without play.

This can be achieved in various ways. Theoretically it is conceivable for the tooth 8 of the tooth arrangement to be provided with an elastically compressible material in the region of its outer edges.

However, owing to the high temperatures at a disk brake and the torque to be transmitted it is preferably embodied in multiple parts. In particular it is advantageous if each tooth 8 has in each case two outer edge parts 15, 16 between which at least one or more compression spring(s) 17 is/are arranged, said compression springs pressing the two outer edge parts 15, 16 apart from one another in such a way that the two outer edges 11, 12 bear without play against the inner edges 13, 14 of the groove 9. Such an arrangement is shown by FIG. 2. The disadvantages of the prior art are easily avoided in this way. Here, as is shown in FIG. 2, that an outer edge part 16 is connected to, or formed in one piece with, the output bushing 5, and the other outer edge part is guided in a moveable, in particular slideable fashion, on the outer circumference of the output bushing, which can be implemented in any desired way, for example by means of a groove/spring arrangement between the output bushing 5 and the moveable outer edge part 15 (not illustrated here). The adjusting direction of rotation is indicated by the arrow S in FIG. 2.

In contrast, according to FIG. 1, on an axial shoulder 18 of the second driver disk 7, which protrudes axially out of the output bushing 5, a toothed disk 19 is mounted so as to be rotatable relative to said output bushing 5, the diameter of said toothed disk 19 corresponding to the diameter of the output bushing, and said toothed disk 19 also having at least one tooth 20 or a plurality of teeth 20 which correspond to the tooth 8. The groove 9 extends axially into the area of the tooth 20.

It saves space and is cost-effective here that the spring is a torsion spring 21 which extends here in a groove 22 which is formed in each case on the axial side in certain sections in the toothed disk and the driver disk 7. The driver disk 7 is connected fixedly in terms of rotation to the output bushing 5. The torsion spring 21 prestresses the output bushing 5 and the toothed disk 19 relative to one another in such a way that the at least one tooth 8 of the output bushing bears against the one inner edge 14 of the groove 9, and the corresponding tooth 20 bears against the other inner edge 13, so that here too the play between the tooth arrangement and the groove 9 is reduced to zero (see also FIG. 1b). In this context, the teeth 8 and 20 of the tooth arrangement are arranged offset with respect to one another in the axial direction.

A toothed coupling 23 between the axial faces of the disk 7 and the toothed disk 19 holds the two elements of the adjuster in a defined prestressing position with respect to one another. By means of webs 24, bent over toward the outside in the manner of a hook, at the axial free end of the shoulder 18, which also functions as a hub for the toothed disk 19, the toothed disk 19 is held and secured in a rotatable fashion against the disk 7 and thus against the output bushing 5 without a relatively large degree of expenditure.

Figure 4:
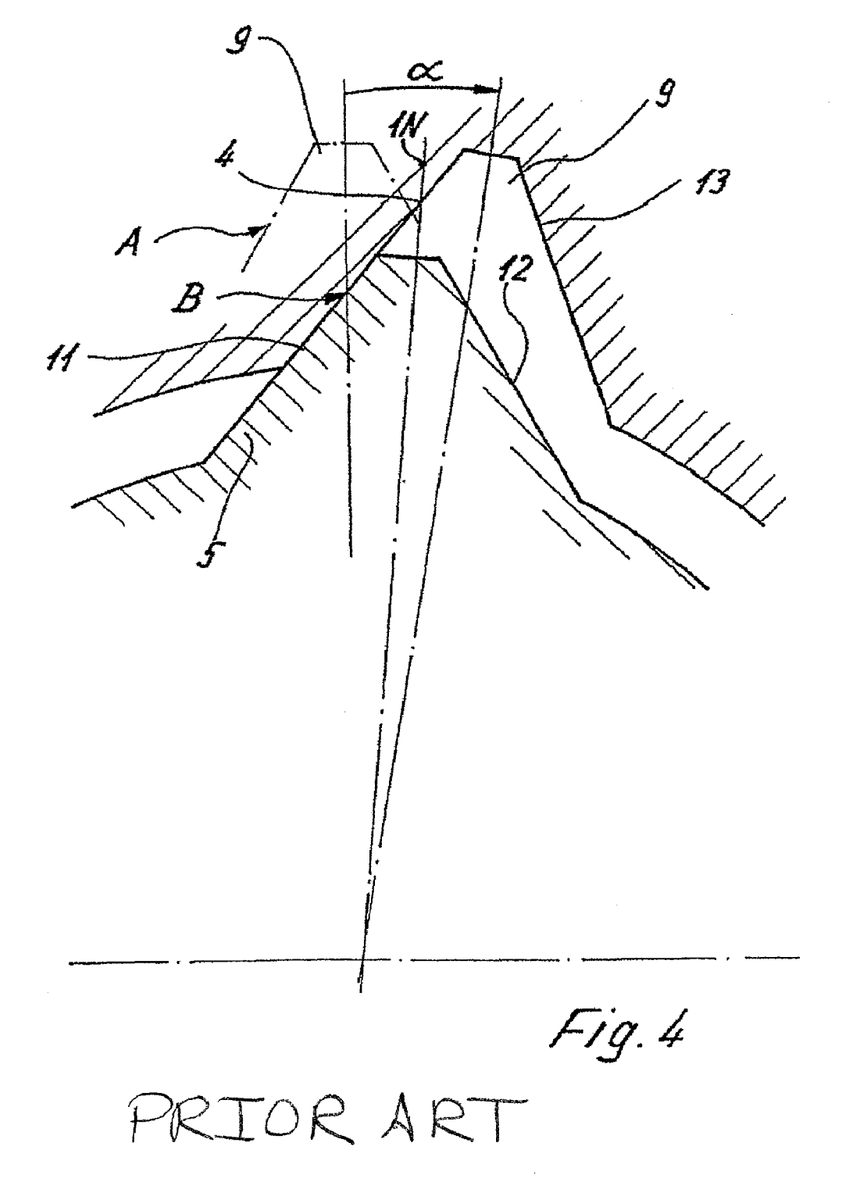
Figure 5:
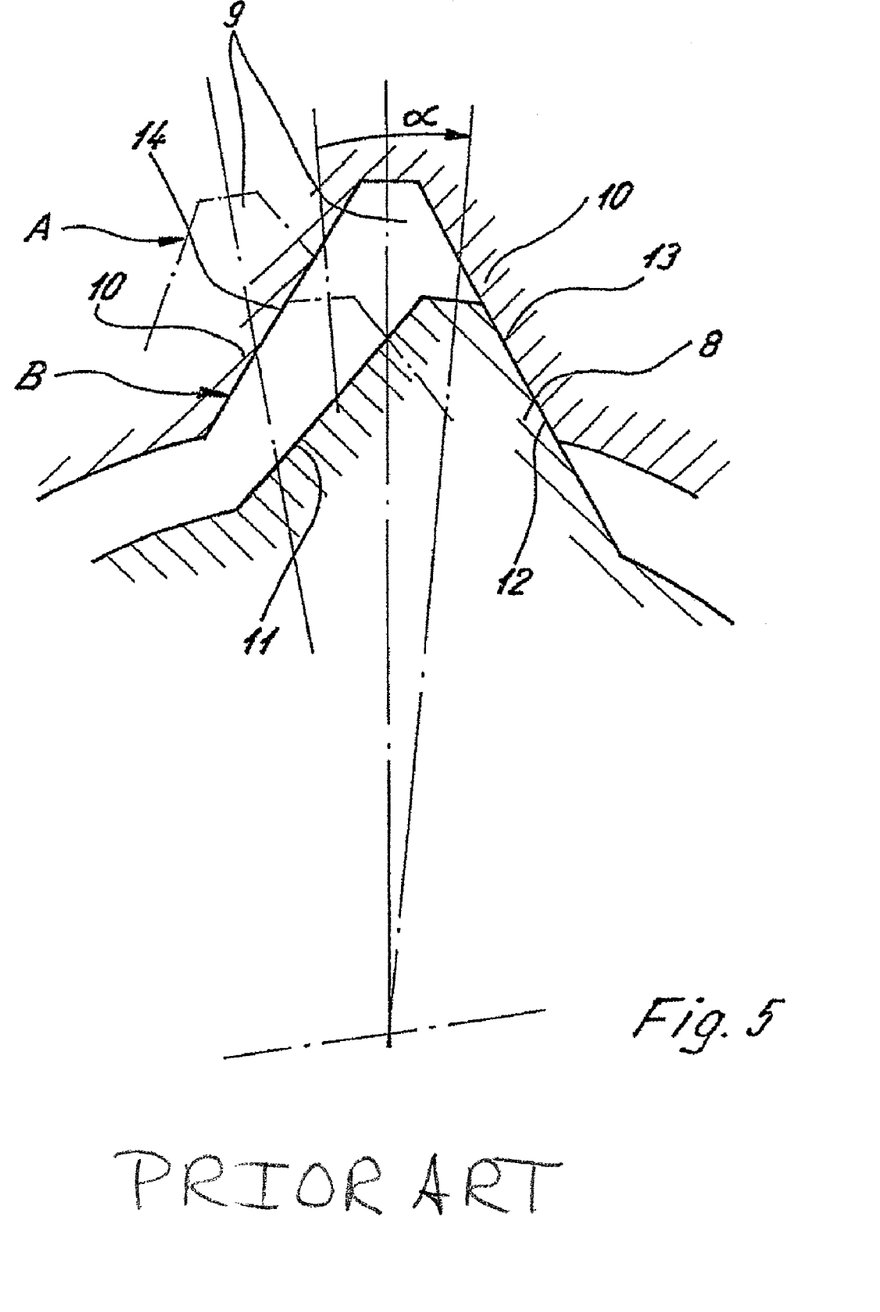

In contrast, FIGS. 3 to 5 show the situation according to the prior art.

FIG. 3 represents the initial position after the brake between a tooth 8 and the groove 9 of the threaded tube or the rotatable spindle 10 has been released again. Due to fabrication reasons, a certain degree of play can be seen, that is to say just one of the outer edges 12 of the tooth 8 bears against one of the inner edges 13 of the groove 9.

As is indicated in FIG. 4, the rotatable spindle 10 can rotate out of a position A into a position B through the angle α in such a way that the other outer edge 11 of the tooth 8 bears against the other inner edge 14 of the groove 9.

FIG. 5 shows that when the adjusting device is activated again, it rotates until the edges bear again one against the other, as in FIG. 1, the entire arrangement of the tooth 8 and threaded tube or rotatable spindle 10 having, however, rotated out of the position A into the position B through an angle α. The invention easily avoids this effect.

FIG. 6 also shows, from the prior art of the generic type, an illustration of an adjusting device of the generic type which is modifiable in the manner of FIG. 1 or 2.

Figure 7:
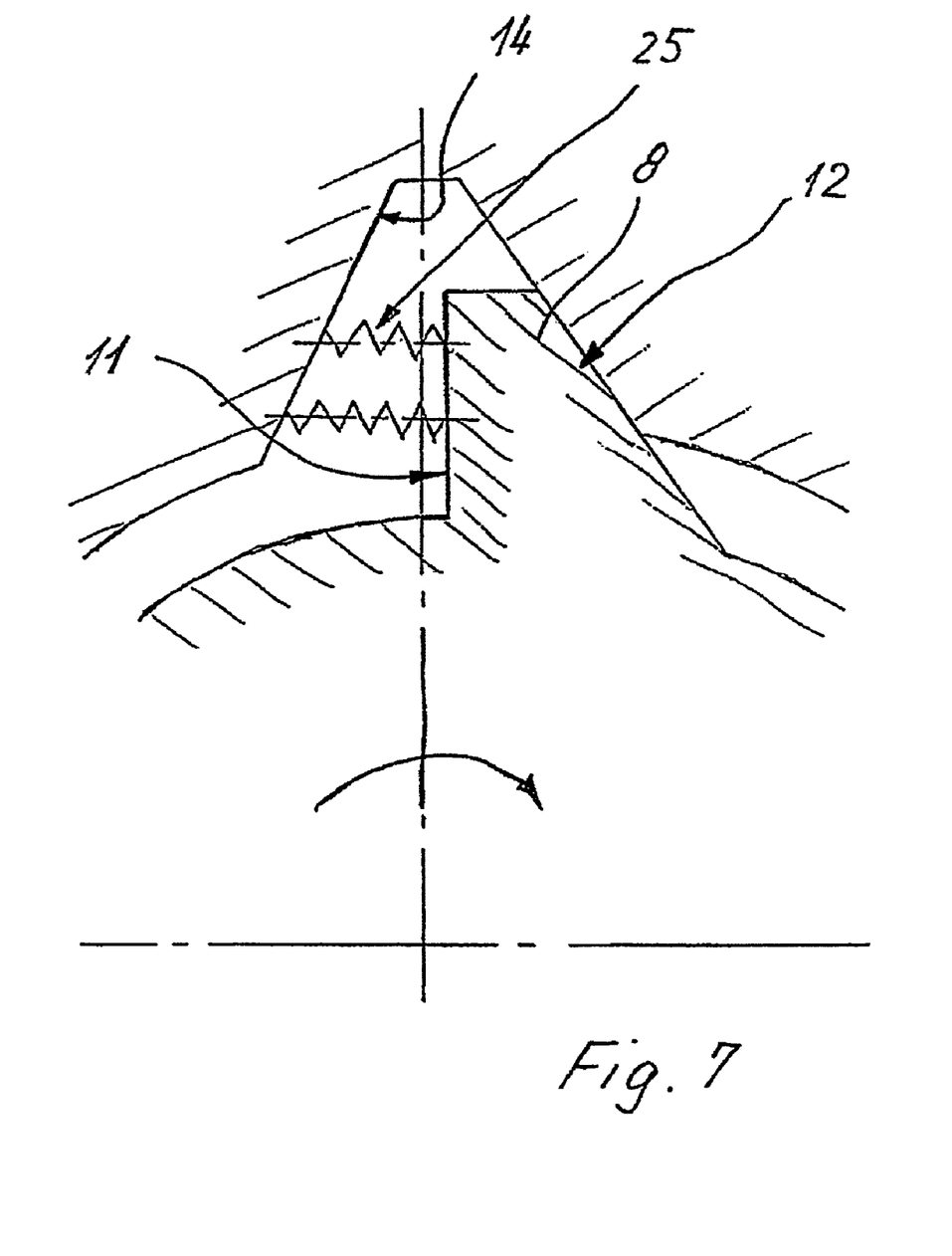
FIG. 7 shows a section through the area of the engagement of an output tooth of the output bushing of a further adjuster according to an embodiment of the invention which engages in a corresponding groove in the rotatable spindle which surrounds the output bushing.
Figure 8:
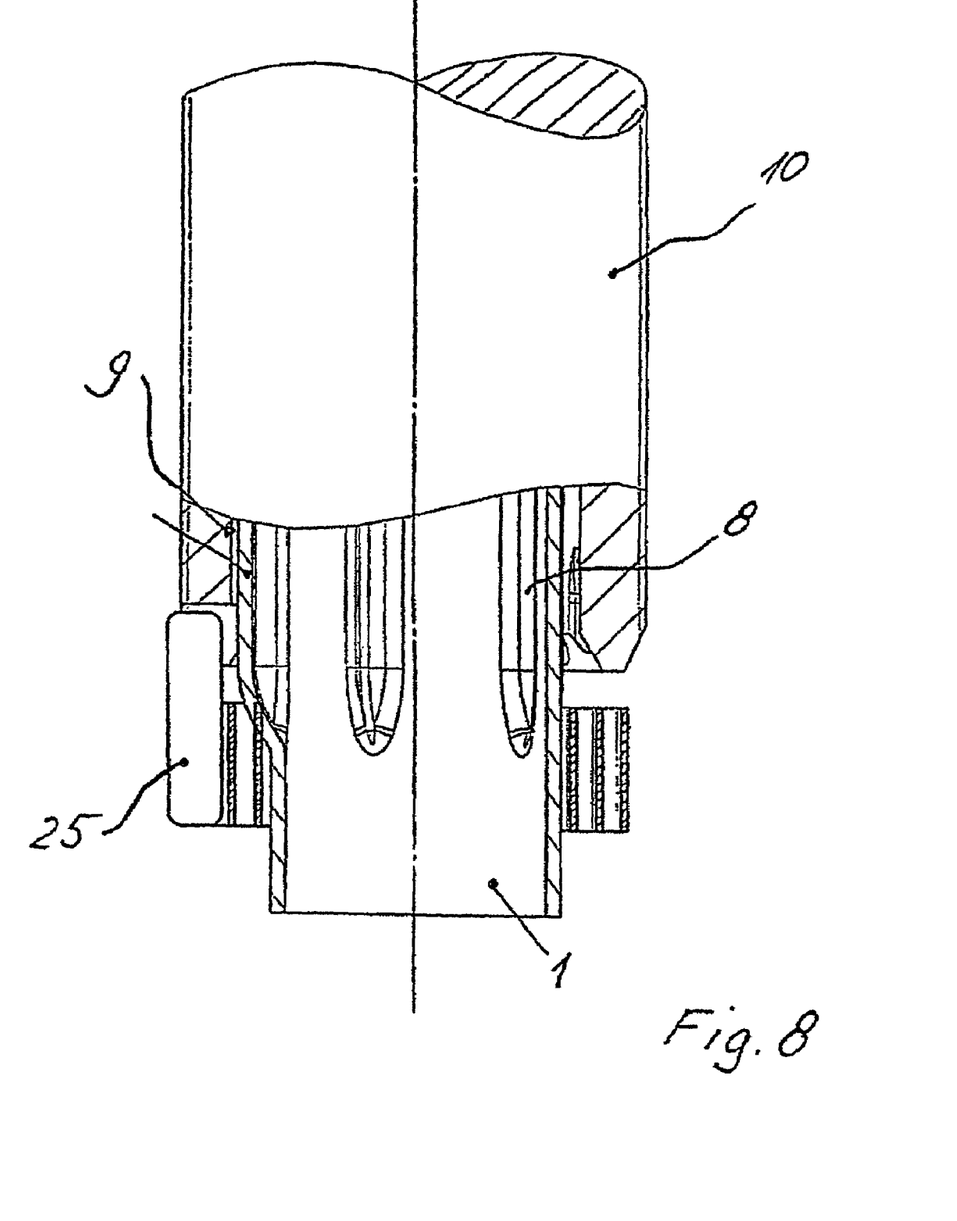
FIG. 8 shows a partially sectional view of the output-bushing-side section of a further adjuster according to the invention.

FIGS. 7 and 8 show an alternative preferred variant in which a spring 25 is arranged directly between one of the outer edges 11 of a tooth 8 and the inner edge 14 of the groove 9, said spring 25 prestressing the tooth and the groove one against the other. There is also as it were no play any more here between the tooth 8 and the groove 9.

Figure 9:
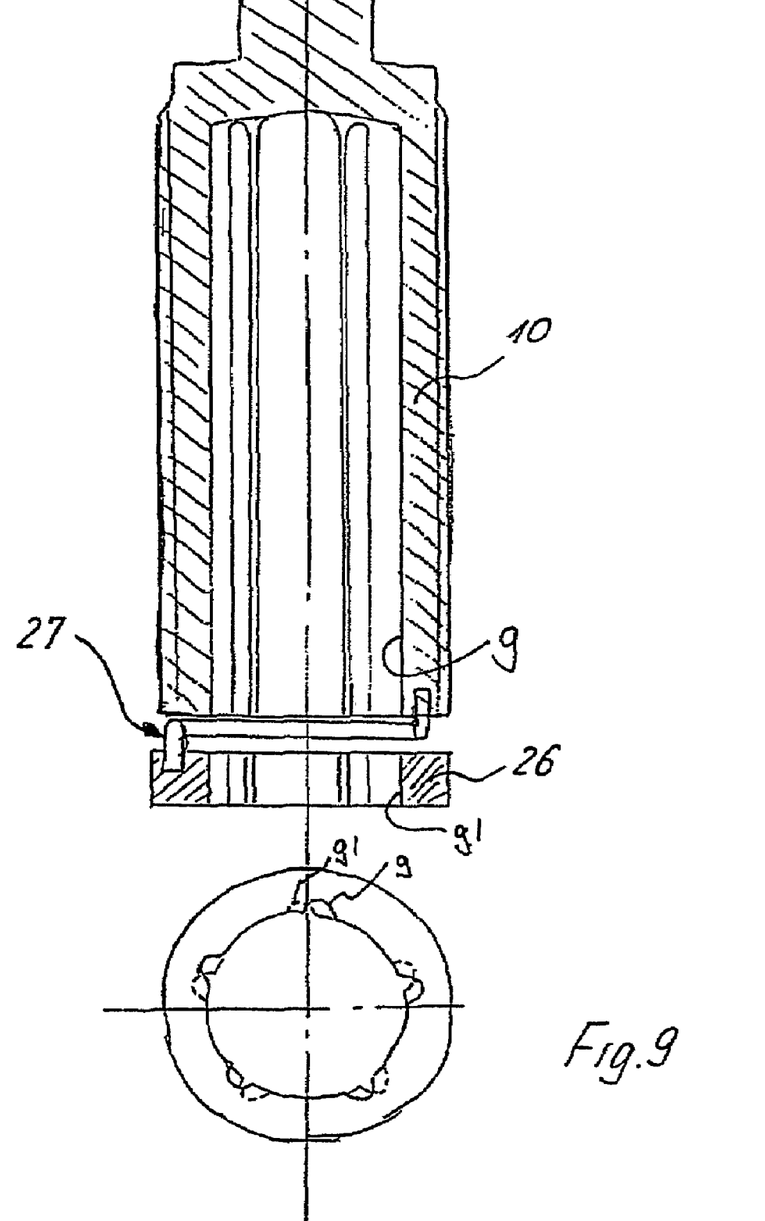
FIG. 9 shows a partially sectional view of the output-bushing-side section of a further adjuster according to an embodiment of the invention.

In contrast, according to FIG. 9, a type of inverted arrangement with respect to FIGS. 1 and 2 is provided. Here, a type of annular disk 26, whose inner circumferential profile corresponds to the inner circumferential profile of the rest of the rotatable spindle 10, is fitted onto the end of the rotatable spindle 10 in the manner of a threaded tube with one or more of the grooves 9.

The teeth 8 or fins on the outer circumference of the adjuster have to be of such a length here that they do not engage only in the groove 9 in the rotatable spindle 10 but also in the groove 9' in the annular disk 26. The annular disk 26 and the rotatable spindle 10 are prestressed relative to one another by means of a sprung element 27 so that here too the inventive effect of "freedom of play" is implemented again. An optional toothed coupling holds these two elements in a prestressed position with respect to one another if appropriate (not shown here).

Figure 10:
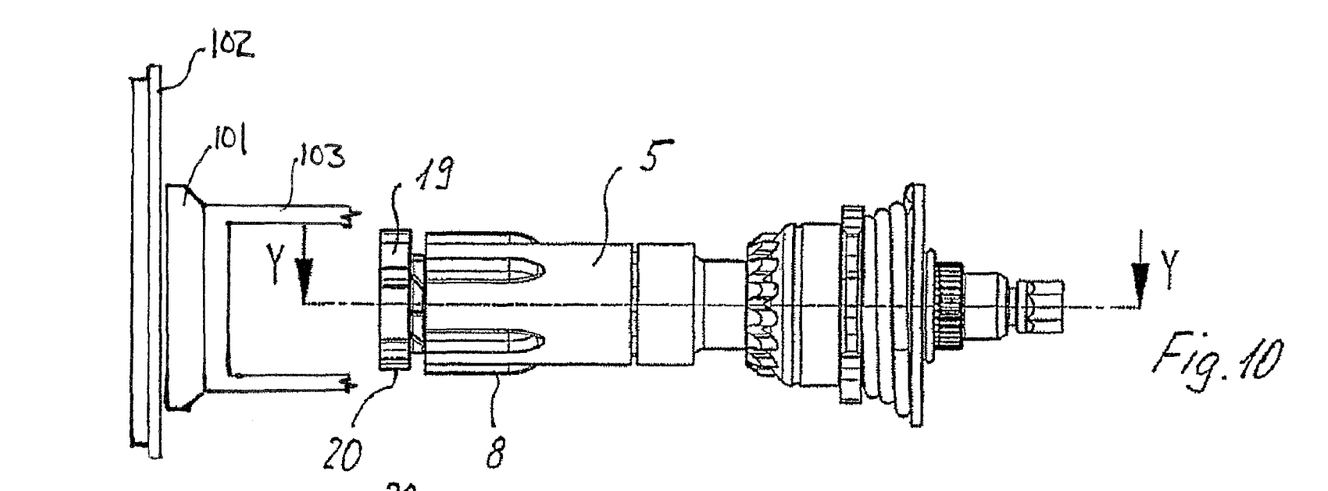
FIGS. 10 & 11 show a side view of a further adjuster according to an embodiment of the invention and a sectional view of this adjuster.
Figure 11:
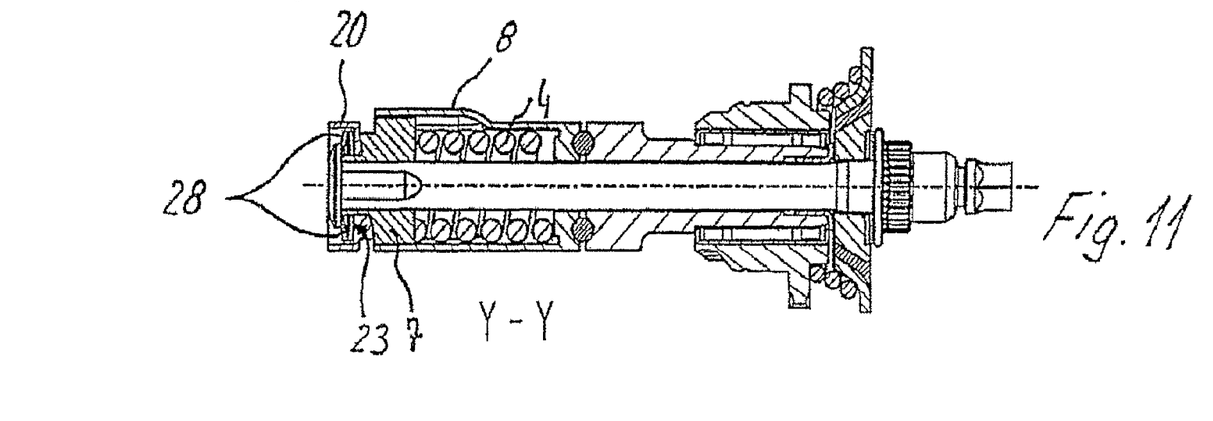
Figure 12:
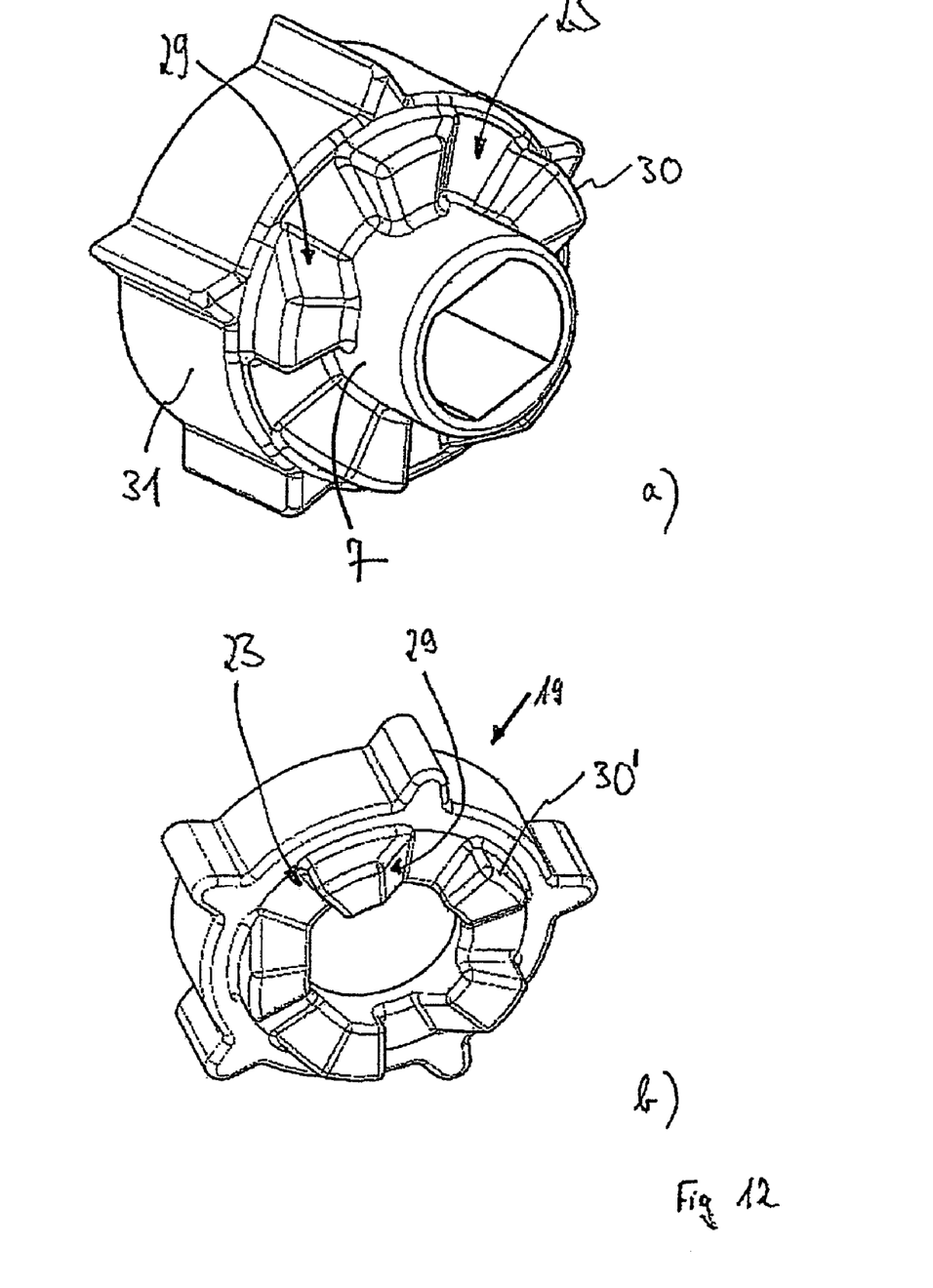

According to FIGS. 10 and 11, the toothed coupling 23 is in turn arranged between the axial faces of a further variant of the toothed disk 19 and the driver disk 7. According to FIGS. 10 and 11, the spring which prestresses these elements is embodied in a space-saving and cost-effective manner as a disk spring 28 which prestresses the toothed disk 19 relative to the driver disk 7 by interacting with sloping ramps 29 on the teeth 30 of the toothed coupling 23. The corresponding teeth 30' of the toothed coupling 23 on the toothed disk also have corresponding sloping ramps 29 (see FIGS. 12a and b). In this way, the rotation position between the toothed disk 19 and the disk 7 can be secured by means of the toothed coupling in order to fix a desired degree of prestress. For clarity, FIG. 10 also schematically shows the relative relationship between the adjuster and a pressure element 101 and brake lining 102 upon which the spindle (an end 103 of which is shown schematically), driven by the adjuster, acts.

Figure 13A:
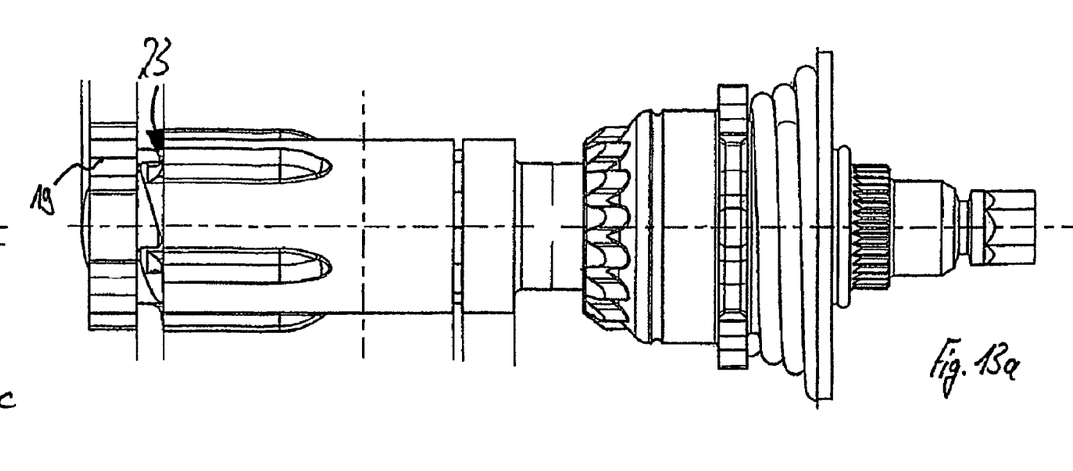
FIGS. 13a-c show a further variant of an adjuster according to an embodiment of the invention in various views.
Figure 13B:
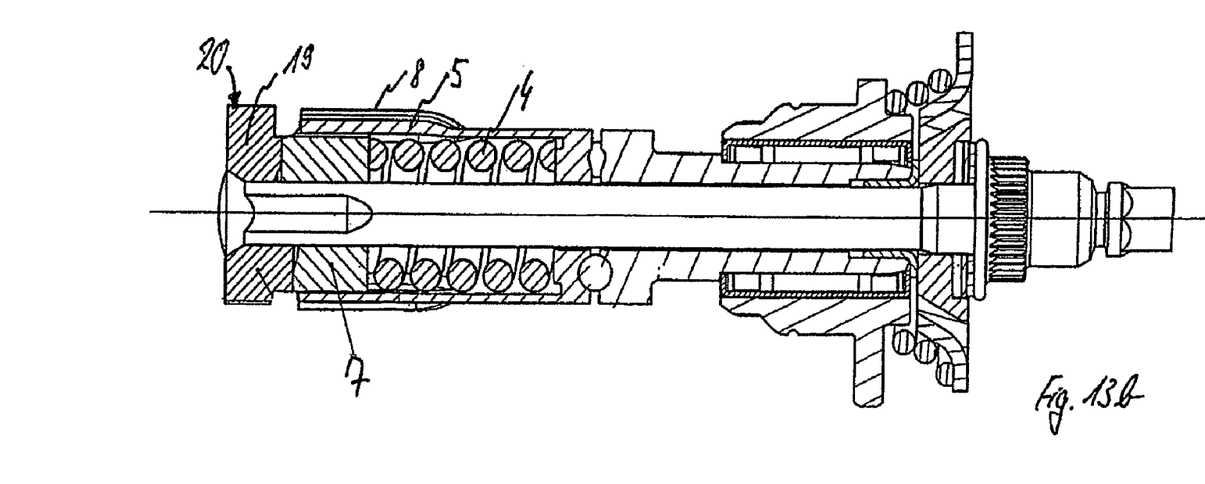
Figure 13C:
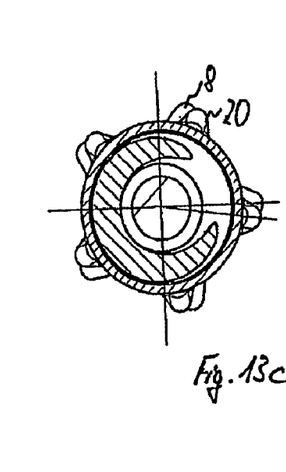

According to FIG. 13, the compression spring 4 is in turn supported between the output bushing 5 and the driver disk 7. The driver disk 7 is adjoined in turn axially by a toothed disk 19, and in turn the toothed coupling 23 is embodied with sloping ramps here between these elements. Given a suitable configuration of the individual elements, a further separate spring can cost-effectively be dispensed with. The compression spring 4 acts as a prestressing spring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

Adjusting device 1
Overload coupling 2
Spherical ramp arrangement 3
Compression spring 4
Output bushing 5
First disk 6
Second disk 7
Tooth 8
Groove 9
Rotatable spindle 10
Outer edges 11, 12
Inner edges 13, 14
Outer edge parts 15, 16
Compression spring(s) 17
Axial shoulder 18
Toothed disk 19
Tooth 20
Torsion spring 21
Groove 22
Toothed coupling 23
Webs 24
Spring 25
Annular disk 26
Sprung element 27
Disk spring 28
Sloping ramps 29a, b
Teeth 30

What is claimed is:

1. An adjusting device of a disk brake, comprising:
an adjuster; and
at least one rotatable spindle which acts on a brake lining via a pressure element,
wherein
the adjuster is configured to cooperate with the at least one rotatable spindle to axially displace the at least one rotatable spindle relative to the adjuster within the disk brake,
the adjuster has an output tooth arrangement with at least one tooth configured to engage a corresponding at least one groove of the at least one rotatable spindle, and
the at least one tooth and the at least one groove have at least one of the following arrangements:
at least one of the at least one tooth and the at least one groove is elastically compressible, and
the at least one tooth and the at least one groove are supported elastically one against the other,
further wherein
the at least one groove is formed on an inner circumference of the at least one rotatable spindle
the adjusting device includes an output bushing which engages in an axial opening in the at least one rotatable spindle and on an outer circumference has the at least one tooth which engages in the at least one groove formed on the inner circumference of the at least one rotatable spindle, and
a spring prestresses two outer edge parts of the at least one tooth which can move relative to one another.

2. An adjusting device of a disk brake, comprising:
an adjuster; and
at least one rotatable spindle which acts on a brake lining via a pressure element,
wherein
the adjuster is configured to cooperate with the at least one rotatable spindle to axially displace the at least one rotatable spindle relative to the adjuster within the disk brake,
the adjuster has an output tooth arrangement with at least one tooth configured to engage a corresponding at least one groove of the at least one rotatable spindle, and
the at least one tooth and the at least one groove have at least one of the following arrangements:
at least one of the at least one tooth and the at least one groove is elastically compressible, and
the at least one tooth and the at least one groove are supported elastically one against the other,
further wherein
the at least one groove is formed on an inner circumference of the at least one rotatable spindle.
the adjusting device includes an output bushing which engages in an axial opening in the at least one rotatable spindle and on an outer circumference has the at least one tooth which engages in the at least one groove formed on the inner circumference of the at least one rotatable spindle,
the at least one tooth has two outer edge parts which can move relative to one another and between which at least one compression spring is arranged, and
the at least one compression spring presses the two outer edge parts apart from one another such that the two outer edge parts bear without play against the inner edges of the at least one groove.

3. The adjusting device as claimed in claim 2, wherein one of the outer edge parts is formed in one piece with the output bushing, and the other of the outer edge parts is guided in a moveable fashion on the outer circumference of the output bushing.

4. An The adjusting device of a disk brake, comprising:
an adjuster; and
at least one rotatable spindle which acts on a brake lining via a pressure element,
wherein
the adjuster is configured to cooperate with the at least one rotatable spindle to axially displace the at least one rotatable spindle relative to the adjuster within the disk brake,
the adjuster has an output tooth arrangement with at least one tooth configured to engage a corresponding at least one groove of the at least one rotatable spindle, and
the at least one tooth and the at least one groove have at least one of the following arrangements:
at least one of the at least one tooth and the at least one groove is elastically compressible, and
the at least one tooth and the at least one groove are supported elastically one against the other,
further wherein
the at least one groove is formed on an inner circumference of the at least one rotatable spindle,
the adjusting device includes an output bushing which engages in an axial opening in the at least one rotatable spindle and on an outer circumference has the at least one tooth which engages in the at least one groove formed on the inner circumference of the at least one rotatable spindle,
a toothed disk adjoins the output bushing, the diameter of said toothed disk corresponding to the diameter of the output bushing and said toothed disk having at least one further tooth which corresponds to the at least one tooth of the output bushing and one of the at least one grooves of the rotatable spindle extending axially into the region of the at least one tooth of the toothed disk,
the toothed disk being rotatable relative to the output bushing, and
the toothed disk and the output bushing being prestressed relative to one another by a spring.

5. The adjusting device as claimed in claim 4, wherein the spring is a torsion spring.

6. The adjusting device as claimed in claim 5, wherein the torsion spring is arranged in a groove in the toothed disk and a disk non-rotatably located in the output bushing.

7. The adjusting device as claimed in claim 6, wherein a rotation position between the toothed disk and the output bushing can be secured by a toothed coupling.

8. The adjusting device as claimed in claim 4, wherein the spring prestresses the toothed disk with sloping ramps on the at least one tooth of the toothed coupling.

9. The adjusting device as claimed in claim 8, wherein the spring is a compression spring.

10. The adjusting device as claimed in claim 9, wherein the compression spring is supported between the output bushing and a driver disk, the toothed disk adjoining the driver disk axially, and the toothed coupling having the sloping ramps between the driver disk and the toothed disk.

11. The adjusting device as claimed in claim 10, wherein the at least one tooth of the tooth arrangement is provided with an elastically compressible material in the region of its outer edges.

* * * * *